Figure 1:
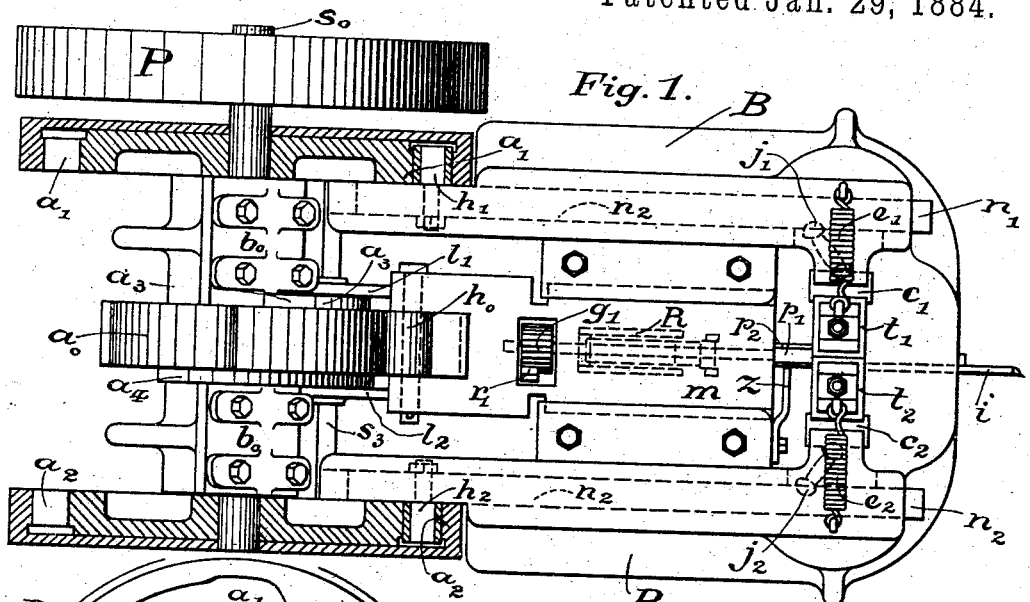

(No Model.)  
2 Sheets—Sheet 1.

J. BRUDERER.
BOLT HEADING MACHINE.

No. 292,534.  
Patented Jan. 29, 1884.

Attest:  
René Gielhaar  
E. Liebenwart

Inventor:  
John Bruderer  
by Brieslainburg & Co. Attys

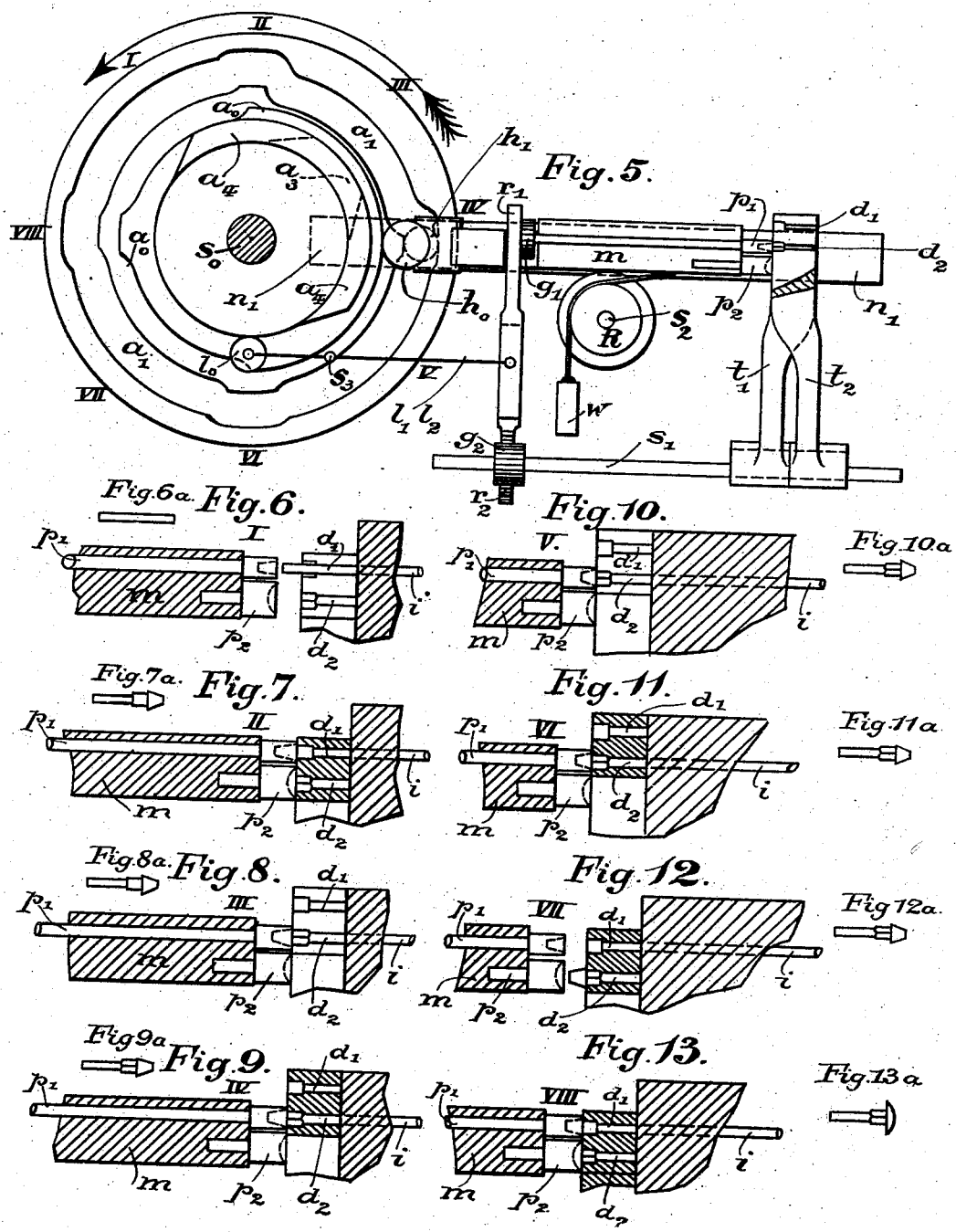

UNITED STATES PATENT OFFICE.

JOHN BRUDERER, OF NEW YORK, N. Y., ASSIGNOR TO GEORGE W. FOWKES, OF HARRISBURG, PENNSYLVANIA.

BOLT-HEADING MACHINE.

SPECIFICATION forming part of Letters Patent No. 292,534, dated January 29, 1884.

Application filed April 25, 1883. (No model.)

*To all whom it may concern:*

Be it known that I, JOHN BRUDERER, a citizen of Teuffen, Switzerland, at present residing in the city and county of New York, State of New York, have invented certain new and useful Improvements in Machinery for Bolt-Heading, of which the following is a specification.

Hitherto it was impossible by using ordinary round iron or wire to forge the square between head and stem of carriage-bolts with a larger area than the area of the cross-section of the iron, therefore causing the corners of the square to project over the round stem only very little, and insufficiently to prevent a turning of the bolt in the hole while it was tightened. Whenever bolts had to be forged with their square part of a larger area than the area of the cross-section of the round stem, or, in other words, whenever a square was wanted whose sides, for instance, were circumscribing the circle of the round stem, square iron had to be resorted to, which implicated, especially for long and heavy bolts, much labor and power in order to forge the round stem. It is true that bolts with their square of larger area than the area of the round stem have already been manufactured out of round iron, but always in two heats and in two separate operations and two separate machines, and not in one operation and in one heat, as my machine enables to do. My machine, therefore, is especially adapted for the manufacturing of carriage-bolts, and will forge the square between head and stem of any desirable area, either prismatical or pyramidical, thus giving ample security against their turning in the bolt-holes, and producing bolts of much better appearance and more uniform strength, there being no contracted or weaker part between square and stem. My improvement further allows a greater speed and capacity of the machine, subjecting iron as well as machine to less sudden strain, forging successively, and not all in one stroke.

I am well aware that in bolt-heading machines gripping-jaws with several matrices in halves have been devised which were said to forge a well-squared shank to the bolt by transferring the blank of round iron successively from the primary matrix to a secondary, and so forth; but in those machines, because complicated mechanical devices were needed to hold the blank while being transferred during the opening of the gripping-jaws with matrices in halves, only a slow speed of the moving parts was possible, and relatively much time was needed for forging a bolt through all the stages of the process; and not considering the unsafeness of the maintenance of the bolt by said mechanism during the vibrations and shocks of the machine, this loss of time would allow the iron to cool too much in order to secure well-forged square corners on the shank. Consequently the machine would never answer for forging carriage-bolts of good shape, and the shapes of the successive matrices were not well adapted for obtaining a good result. The machines, however, will well answer for any screws or rivets, though not for such complicated heads as carriage-bolts. In my machine, to the contrary, a most simple device allows to transfer the bolt safely and quickly from one matrix to the other, as the header itself, owing to the particular shape of the upsetted part, maintains the bolt in the desired position, and therefore, a greater speed of the moving parts being possible, the whole process of forging may go on quicker, and owing, also, to the particular shape of the successive matrices, the finished bolt will show sharp-cornered and square shanks, and will be perfect in every respect. My machine will therefore give a greater production per day for the very reason given above.

I am further well aware that machines have been devised with several matrices provided in the block of the ram or header for gradually shaping the head of bolts, said ram, however, in combination with stationary gripping-jaws, said jaws opening solely for the purpose to drop the finished bolt, and being provided with but one matrix, evidently with the purpose of shaping the squared shank at once. It is obvious that especially for long squared shanks this mode is incapable of forging sharp-edged and clean square shanks. The iron in this case is crushed, and no gradual forging takes place here. With my arrangement, however, where the square shank, like the head, is gradually shaped, the bolt will naturally be even and more precise in shape than by said forced operation, and as my machine requires but little time for forging a bolt through all the successive stages into its finished shape the blank has not time enough to cool to such a degree as to prevent the bolt from coming out with sharp-cornered shanks.

The above-mentioned forced operation is also more adapted for treating cold metal in the cold-pressing process than heated material.

My machine consists in a main shaft carrying the driving-pulley, and three cams—one in the center and one at each end. The center cam imparts a to-and-fro motion to a horizontal slide, said slide being provided with two plungers for forging successively the head of bolts, one plunger with a conical hollow set vertically above the other, having a hollow for the ordinary rounded head, said center cam having besides on each side a cam for operating two racks sliding vertically up and down, one rack turning at the proper time, when the first squaring has to be done, by means of a gear-wheel, the top plunger for a quarter-turn, in order to forge down by the second squaring any burr eventually formed at the first squaring, and the second rack turning for half a turn and at the proper time whenever the upset-blank has to be transferred into the squaring-matrix, a shaft at the bottom of the machine by means of a gear-wheel, said shaft carrying eccentrics, raising and lowering therewith two prongs or die-holders, which die-holders at the height and opposite of the horizontal slide operated by the center cam are provided with two dies, in halves, for forging the square and for receiving the round stem, the upper one answering for the cylindrically-upset blank, and the lower for the finishing of the square, corresponding in distance from each other to the distance between the two plungers, and facing successively the upper or lower plunger, according to the stage of the process. Said die-holders have besides their up and downward motion a clasping motion opening three times during one revolution of the cam-shaft—first, when the blank is to be received; second, when the upset blank is to be transferred to the lower matrix; and, third, when the finished bolt is to be dropped from the lower matrix. The die-holders further, simultaneously with receiving the blank are shearing them off by passing before the feed-hole provided either within a heavy block cast to the bed-plate of the machine or within a steel die fitted to said heavy block, said block backing the die-holders just opposite of the point where the strokes from the horizontal slide are received. The clasping motion of the die-holders is caused by springs for the opening motion, and for the closing motion by slide bars acting by means of toggle-links and intermediate slide pieces on the die-holders, said bars being operated by the two side cams on the driving or cam shaft.

Figure 2:
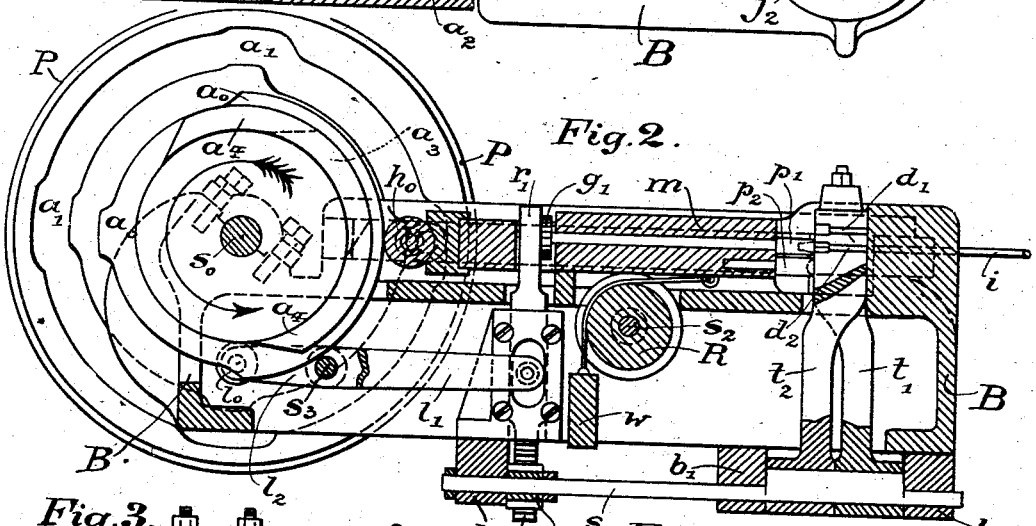
Figure 3:
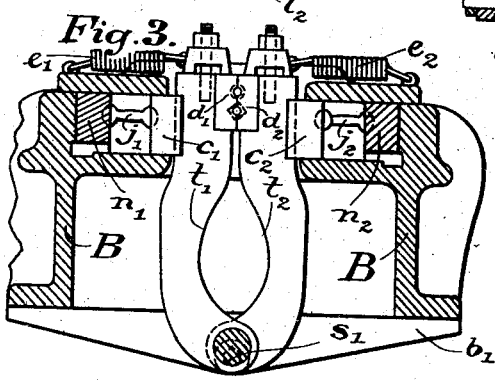
Figure 4:
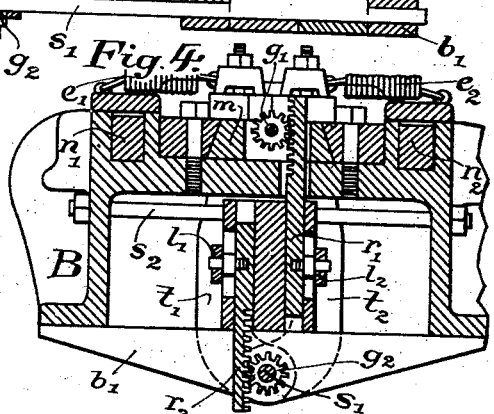

In the accompanying drawings, Figure 1 represents a general plan of the machine; Fig. 2, a part length section and part elevation; Fig. 3, a cross-section through the die-holders, with matrices, and Fig. 4, a cross-section through the sliding racks. In Fig. 5 a diagram of the main parts is given, and in Fig. 6 to 13 and $6_a$ to $13_a$ the different stages of the forging for each eighth of a revolution of the cam-shaft with the corresponding shapes of the bolt to be forged, the Roman figures in diagram Fig. 5 referring to Roman figures in Figs. 6 to 13.

Similar letters in different figures refer to corresponding parts.

B represents the bed-plate or main body of the machine; $s_0$, the driving or cam shaft, within bearings $b_0 b_0$, with driving-pulley P, the sense of motion indicated by arrow, said shaft carrying cams $a_0$, $a_3$, and $a_4$, and $a$ and $a_5$. Cam $a_0$ is imparting a to-and-fro motion to the side $m$ by means of a cushion-roller $h_0$, said slide carrying plungers $p_1$ and $p_2$, plunger $p_1$ being provided with gear-wheel $g_1$ and plunger $p_2$ fitted into slide $m$, the back motion of said slide $m$ being operated in the machine shown by roller R on shaft $s_2$ with weight W. This back motion may be operated also in any other way, either by applying a grooved cam or by springs, &c. Cam $a_3$ $a_4$ are operating on the levers $l_1$ $l_2$, provided with rollers $l_0$ $l_0$, said levers swinging on shaft $s_3$, and sliding the racks $r_1$ and $r_2$ up and down, thereby turning gear-wheel $g_2$ for a quarter-turn, and cam-shaft $s_0$ for half a turn, each at the proper time. By the quarter-turn of plunger $p_1$ turning also the bolt, which has been squared for the first time for a quarter-turn, a new corner is offered to the clasp of the dies for the second squaring, thereby forging down any burr formed through the joints of said dies at the first squaring by the half-turn of the eccentric shaft $s_0$, however raising the die-holders $t_1$ $t_2$ with dies $d_1$ $d_2$ whenever the upset blank has to be transferred from the upsetting-matrix to the squaring-matrix. Rollers $l_0$, on levers $l_1$ $l_2$, are kept resting against cams $a_3$ and $a_4$, either simply by weight of racks $r_1$ $r_2$, as in the given drawings, or if needed by means of springs, weights, or other devices. Shaft $s_1$, within bearings $b_1 b_1 b_1$ at the bottom of the machine, being provided with an eccentric, carries thereon die-holders $t_1$ $t_2$, thus raising or lowering said die-holders whenever said shaft makes its half-turn. Within said die-holders, and at their top opposite to the slide $m$, are fitted dies in halves with matrices $d_1$ $d_2$, the top $d_1$ answering for the upsetting operation, and the lower $d_2$ answering for the squaring, each being brought before plunger $p_1$ or $p_2$ at the proper time, as will be set forth hereinafter, die-holders $t_1$ $t_2$ being backed by a heavy re-enforcement cast to bed-plate B, said re-enforcement serving as support for die-holders $t_1$ $t_2$ against the hammering of slide $m$, with plungers $p_1$ and $p_2$. Within this re-enforcement the feed-hole for the wire or round iron $i$ is provided either directly in the cast-iron or in a steel block fitted thereto, shearing off the blanks whenever the die-holders close for the first time, the relative height of said feed-hold being thus, that the blank is received in the upper matrix $d$ and the length of the blank being gaged by the stop-piece $z$, fastened on the guides of horizontal slide $m$.

The clasping motion of the die-holders $t_1 t_2$ is derived from cams $a_1$ and $a_2$, said cams operating by means of rollers $h_1$ and $h_2$, the slide-bars $n_1 n_2$, which, by means of a toggle-link, $j_1 j_2$, and intermediate slide-pieces, $c_1$ and $c_2$, force the dies to a tight clasp, said clasp being opened again by springs $e_1$ and $e_2$, whenever the position of the slide-bars $n_1$ and $n_2$, toggle-links $j_1 j_2$, and intermediate slide-pieces, $c_1 c_2$, will allow it, intermediate slide-pieces, $c_1 c_2$, having for their object to secure to the toggle-links $j_1 j_2$ a horizontal position during their operation.

The succession of the operations is illustrated in Figures 5, 6, 7, 8, 9, 10, 11, 12, and 13, the bolt in its different stages of forging for each eighth of revolution being shown in Figs. $6_a, 7_a, 8_a, 9_a, 10_a, 11_a, 12_a, 13_a$, all corresponding to diagram in Fig. 5.

The position of the machine shown in Figs. 1, 2, 3, and 4 answers to the position IV, as marked in diagram 5. As will be seen, therefore, for each revolution of the cam-shaft one bolt is forged, and brought from the blank to its final shape, not by a single stroke, but by a series of manipulations, thus imitating a good forging, and producing sound and strong bolts without any burrs or imperfect spots.

In Figs. 6 to 13 the dies in their open position are marked, for convenience' sake, without any hatching, and their closed position or clasp is marked by being hatched. In Fig. 6 the dies are represented open, the feed-hole in this case being uncovered by the dies, and the wire butting against the gage $z$, as shown in Fig. 1, slide $m$ being in its farthest position off the dies, and said dies being in their lowest position. From this position 6 the operation will be as follows: Die-holders $t_1 t_2$ clasp together, thereby shearing off a blank of proper length, catching it into matrix $d_1$, for the upsetting, and instantly slide $m$, with plunger $p$, will ram the blank with one stroke into the shape of matrix $d_1$, thus forming a conical head and a cylindrical upset part on the original blank. This is represented in Fig. 7 and $7_a$. The conical head is of such a taper as to cause the bolt to stick tightly in plunger $p_1$, so as to maintain the bolt rigidly in position while the die-holders are opening again, and rising until matrix $d_2$ stands at the height and opposite of plunger $p_1$, this position being represented in Fig. 8, whereupon the dies are clasped together, thus squaring the bolt for the first time by giving it the shape of matrix $d_2$, being represented in Fig. 9. Then tongues $t_1 t_2$ open again, the bolt, owing to its conical head, still sticking fast in plunger $p_1$, and, while the dies open, the quarter-turn of plunger $p_1$ takes place, thus causing two other corners of the square to face the opened matrices, (this position is given in Fig. 10,) whereupon the second squaring is performed by the clasp of the dies, thereby forging down any burr which might have formed on the square at the joints of the dies during the first squaring, thus producing a clean and round bolt. This position is given in Fig. 11. Now slide $m$, with plunger $p_1$, moves off again, die-holders $t_1 t_2$ descending until $d_3$ corresponds to $p_2$, as is illustrated in Fig. 12, and, finally, slide $m$ gives the second or finishing blow to the bolt-head by giving it the ordinary rounded shape, which position is shown in Fig. 13, after which the bolt is forced to drop simply by the opening of the dies, whereupon the first position (given in Fig. 6) is assumed, and the whole process repeated for a second bolt. The bolt is forced to drop because the rounded hollow of plunger $p_2$ is not sufficient to hold the head, but sufficient to prevent it from following or sticking to either of the two opening matrices.

Having thus fully described the process of manufacturing carriage-bolts, I wish to state that I do not limit myself to carriage-bolts alone, as bolt-heads of any desired shape may be forged by this method by changing matrices and plungers, and especially bolts with pyramidical square.

What I claim as new, and wish to secure by Letters Patent, is—

1. The combination, substantially as shown and described, of the mechanism for forming, with a single stroke, a conical-shaped head and enlarged round shank for bolts, and the mechanism for changing the planes of elevation of said matrices, to enable them to act successfully in upsetting and squaring the enlarged round shank, the whole combined with the mechanism for giving a quarter-turn to the plunger carrying the bolts preparatory to the second squaring thereof.

2. In a bolt-heading machine, the combination, substantially as shown and described, of the shaft $s_0$, cams $a_0, a_3,$ and $a_4$, cushion-roller $h_0$, slide $m$, plunger $p_1 p_2$, gear-wheel $g_1$, rack-bars $r_1 r_2$, levers $l_1 l_2$, roller $l_0$, pulley R, and weight W.

3. In a bolt-heading machine, shaft $s_0$, cams $a_1 a_2$, rollers $h_1 h_2$, slide-bars $n_1 n_2$, toggle-joints $j_1 j_2$, intermediate pieces, $c_1 c_2$, springs $e_1 e_2$, and supports B B.

4. The combination, substantially as shown and described, of shaft $s_0$, pulley P, cams $a_1 a_2$, rollers $h_1 h_2$, slide-bars $n_1 n_2$, toggle-joints $j_1 j_2$, intermediate pieces, $c_1 c_2$, springs $e_1 e_2$, cams $a_0 a_3 a_4$, roller $h_0$, slide $m$, plungers $p_1 p_2$, gear-wheel $g_2$, shaft $s_1$, levers $l_1 l_2$, and bed-plate B of a bolt-heading machine.

5. The combination, substantially as shown and described, of pulley P, shaft $s_0$, cams $a_1 a_2$, rollers $h_1 h_2$, slide-bars $n_1 n_2$, toggle-joints $t_1 t_2$, matrices or dies $d_1 d_2$, springs $e_1 e_2$, cam-shafts $s_1$, and bed-plate B of a bolt-heading machine.

6. The combination, substantially as shown and described, of the pulley P, shaft $s_0$, bearings $b_0 b_0$, cams $a_1 a_1$, rollers $h_1 h_2$, slide-bars $n_1 n_2$, toggle-joints $j_1 j_2$, push-pieces $c_1 c_2$, springs $e_1 e_2$, matrices or dies $d_1 d_2$, tongue $t_1 t_2$, cam-shaft $s_1$, gear-wheel $g_2$, rack-bars $r_1 r_2$, gear-wheel $g_1$, levers $l_1 l_2$, shafts $s_3$, roller $l_0$, cams $a_0 a_2 a_1$, roller $h_0$, slide $m$, plunger $p_1 p_2$, stop $z$, pulley R, weight W, and bed-plate B, all forming a complete machine.

In testimony whereof I hereunto sign my name in the presence of two subscribing witnesses this 13th day of April, 1883.

J. BRUDERER.

Witnesses:
 RENI SECLHAAZ,
 J. H. CHESLEY.